(12) United States Patent
Beavers et al.

(10) Patent No.: US 7,487,211 B2
(45) Date of Patent: *Feb. 3, 2009

(54) INTERACTIVE, COMPUTER NETWORK-BASED VIDEO CONFERENCING SYSTEM AND PROCESS

(75) Inventors: Jay Beavers, Duvall, WA (US); Randy Hinrichs, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 891 days.

This patent is subject to a terminal disclaimer.

(21) Appl. No.: 10/305,319

(22) Filed: Nov. 25, 2002

(65) Prior Publication Data

US 2004/0003040 A1  Jan. 1, 2004

Related U.S. Application Data

(60) Provisional application No. 60/392,898, filed on Jul. 1, 2002.

(51) Int. Cl.
*G06F 15/16* (2006.01)
(52) U.S. Cl. ............... 709/205; 709/203; 709/218; 709/229; 709/248
(58) Field of Classification Search ............ 709/202, 709/204, 206, 224, 227, 228, 234, 205, 235; 370/487
See application file for complete search history.

(56) References Cited

U.S. PATENT DOCUMENTS 5,991,276 A * 11/1999 Yamamoto ............... 370/260
6,138,144 A * 10/2000 DeSimone et al. ........ 709/204
6,288,739 B1 * 9/2001 Hales et al. .............. 709/206
6,438,604 B1 * 8/2002 Kuver et al. .............. 709/234
6,463,471 B1 * 10/2002 Dreke et al. .............. 709/224
6,556,588 B2 * 4/2003 Wan et al. ................ 370/474
6,594,703 B1 * 7/2003 Li ........................... 709/235
6,901,448 B2 * 5/2005 Zhu et al. ................. 709/228

(Continued)

OTHER PUBLICATIONS

"Multicast—Wikipedia, the free encyclopedia", http://en.wikipedia.org/wiki/Multicast, printed on Sep. 24, 2007, pp. 1-4.*

(Continued)

*Primary Examiner*—Quang N. Nguyen
(74) *Attorney, Agent, or Firm*—Lyon & Harr, LLP; Richard T. Lyon

(57) ABSTRACT

A video conferencing system and process is presented that employs a distributed computer network, such as the Internet or a proprietary intranet, to conduct virtual conferences. Each conference has a computer that has access to the network, as well as audio equipment and a video camera for capturing audio and video (A/V) at the conferencee's site. Conducting a conference generally entails each of the conferencee's computers multicasting the A/V data captured at the conferencee's location over the network. At the same time, each conferences subscribes to A/V data multicoated by other conferences participating in the conference. The A/V data received by a conference over the network from the other conferences is rendered and played by the conferencee's computer. In this way, each conference can see and hear the other participating conferences during the conference.

16 Claims, 9 Drawing Sheets

U.S. PATENT DOCUMENTS

| | | | |
|---|---|---|---|
| 2001/0012304 A1* | 8/2001 | Agraharam et al. | 370/487 |
| 2001/0037472 A1* | 11/2001 | Li | 714/4 |
| 2002/0048275 A1* | 4/2002 | Atwater et al. | 370/409 |
| 2002/0143951 A1* | 10/2002 | Khan et al. | 709/205 |
| 2003/0005035 A1* | 1/2003 | Rodgers | 709/202 |
| 2003/0182428 A1* | 9/2003 | Li et al. | 709/227 |
| 2004/0128350 A1* | 7/2004 | Topfl et al. | 709/204 |

OTHER PUBLICATIONS

"Multicast: Information and Much More from Answers.com", http://www.answers.com/multicast?cat=technology, printed on Sep. 24, 2007, pp. 1-7.*

"What is multicast?—A Word Definition From the Webopedia Computer Dictionary", http://www.webopedia.com/TERM/m/multicast.html, printed on Sep. 24, 2007, p. 1.*

* cited by examiner

INTERACTIVE, COMPUTER NETWORK-BASED VIDEO CONFERENCING SYSTEM AND PROCESS

CROSS-REFERENCE TO RELATED APPLICATIONS

This application claims the benefit of a previously-filed provisional patent application Serial No. 60/392,898 filed on Jul. 1, 2002.

BACKGROUND

1. Technical Field

The invention is related to video conferencing, and more particularly to a video conferencing system and process that employs a distributed computer network, such as the Internet or a proprietary intranet, to conduct virtual conferences.

2. Background Art

Videoconferencing is an invaluable teaching and business tool that lets people at different locations hear and see each other during the course of a conference. The fact that conference participants can see each other as they speak makes it seem as if they are in the same room. This visual connection between the participants fosters understanding of the topics being discussed in a way that written or verbal communications alone cannot provide. In addition, since the participants do not need to gather at the same physical location, scheduling the conference is much easier, and the cost and lost time associated with traveling to the meeting place is saved. This is especially true if the conferences are separated by large distances, for example in another city or state or even country.

In the past videoconferencing systems typically required the use of an Integrated Services Digital Network (ISDN) connection as this was the only way to provide the dedicated bandwidth needed to ensure high quality video feeds. However, more recently progress has been made in the field Internet-based videoconferencing systems. Granted early attempts were problematic because the video data had to compete for bandwidth with other data flowing across the network, resulting in lost data which caused unreliable connections and substandard video. This problem has been mitigated somewhat with the use of high bandwidth private networks (intranets). These improved results may even be available in the future over high bandwidth public networks, such as proposed by the Internet2 project.

However, even with improved bandwidth, there is still a lack of video conferencing systems and processes designed for connecting people at different locations in a distributed conference on a public computer network or private intranet which provide ease of use, and high quality, low latency audio and video.

SUMMARY

The present invention is directed toward a video conferencing system and process that provides the desired ease of use, as well as high quality, low latency audio and video communications between the conference participants over a distributed computer network, such as the Internet or a proprietary intranet. Essentially, each conference has a computer that has access to the network, as well as audio equipment and a video camera for capturing audio and video (A/V) at the conferencee's site. It is noted that a conference is defined for the purposes of the present invention as one or more people located at the same site. Thus, a conference could actually be a group of people gathered in the same physical conference room.

In general, conducting a conference in accordance with the present conferencing system and process entails each of the conferencee's computers multicasting the audio and video data captured at the conferencee's location over the network. At the same time, each conference subscribes to audio and video data multicoated by other conferences participating in the conference. The audio and video data received by a conferences over the network from the other conferences is rendered and played by the conferencee's computer on an associated display and audio system. In this way, each conference can see and hear the other participating conferences during the conference. There are some caveats to this generally involving options where a conference can forego providing audio and/or video to the other conferences, and can elect to play or not play the audio and/or video received from the other conferences. It is noted that the multicoated data includes information identifying the particular conference providing the data. This information is used to differentiate the incoming A/V data between conferences to facilitate the rendering process To implement the present conferencing system, a conferencee's computer is loaded with conventional processing programs for multicasting and receiving the A/V data over the network, as well as a unique conferencing system program for orchestrating the multicast, receipt, rendering and playing of A/V data, as well as providing a user interface that is employed by a conference to control their participation in a conference. In addition, as it is desired that the present conferencing system provide a substantially real time conferencing experience, high quality video with a low latency is needed. This could be achieved, for example, by employing a digital video camera connected to a conferencee's computer via an IEEE 1394 interface. In addition, while any video codec can be used for the transfer of the video and audio data over the network, some tested versions of the present conferencing system employed M-JPEG, MPEG-4, DivX and MSVideo codecs with success. As for the audio portion of the conference, tested versions of the conferencing system employed a high end audio system to handle the site audio requirements that included echo cancellation, automatic gain control and noise reduction. In order to prevent the inevitable loss of A/V data over the network from significantly degrading the conferencing experience provided by the present invention, a layered multicast format comprising forward error correction layers can be employed.

Multicasting A/V data in the manner described above requires that each of the conferences obtain a multicast address that is assigned to the conference, and then use the address in transmitting A/V data over the network. Rather than assigning a separate address to every conference that may be held, a multicast address is associated with a venue. A venue is essentially a virtual conference room. While it does not have any physical location, establishing venues and associating each with a unique multicast address has a variety of advantages. First, as alluded to above, every conference scheduled for the venue would have the same multicast address, thereby reducing the number of addresses that have to be created and maintained. In addition, a venue can be given a name, can be affiliated with particular organizations, companies, etc., and can be assigned access criteria that is used to restrict access to authorized conferencees only.

While the multicast address associated with a venue can be obtained in any conventional manner, it is envision that a venue server would be established on the network for the purpose of distributing the addresses to potential conferencees. Essentially, a conference desiring to participate in a conference scheduled for a particular venue would contact the venue server and request the multicast address of the venue in question. The conference would then use the multicast address it receives from the server to multicast A/V data and to subscribe to the multicasts coming from the other conferencees, starting at a prescribed time established for the conference.

The foregoing process can also be automated by configuring the aforementioned conferencing system program so as to cause the conferencee's computer to automatically contact the venue server over the network at a prescribed address whenever the system is activated. The program then causes a request that all the multicast addresses associated with venues the requesting conference is allowed to access be provided to the conferences. These addresses are transmitted to the requesting conferencee's computer and presented to the conference as venues which can be selected and entered when a conference is scheduled in the venue. To this end the venue server also preferably maintains information about each conference venue other than its multicast address, such as the name of the venue name, its affiliation and a list of criteria for determining whether a conference is allowed access to a particular venue. All or some of the information about the venues is transmitted to the conferencee's computer along with the multicast addresses. This information can be used to help present the venue to the conferences. For example, the aforementioned user interface can display venue icons representing the venues with the name of the venue listed below the icon. The venue server can also maintain a calendar of conferences scheduled for each venue. This calendar information can also be provided to a conference with the other venue information, or provided upon request, preferably as long as the conference is authorized to access the venue.

In order to determine whether a conference is allowed access to a venue, the conference is required to provide information to the server. This information is used to assess whether the conferences is allowed access to a venue based on the access criteria established for that venue. In one version of the conferencing system and process, the multicast addresses and venue information of only those venues the conference is allowed access to is sent to the conferencee's computer. In another version of the conferencing system and process, venue information of all the venues is provided, but the conferences can only access authorized venues. It is noted that the conference information could be pre-loaded into the conferencee's computer and provided automatically to the server whenever the conferencing program is activated. The venue server can also retain the conference information and provide it to another conference upon request. For example, such information as a conferencee's name, physical location, email address and telephone number could be retained and provided to other conferencees. While this information could be requested and exchanged directly between conferencees, obtaining it from the venue server may be more convenient.

In regard to the aforementioned user interface, this can take the form of an interactive conferencing window that is displayed to the conference (or a representative if the conference is a group of people at the same physical location) when the conferencing system is activated. The conference interacts with the window using standard graphical user interface methods and the selection and data entry devices (e.g., a computer mouse and keyboard) connected to the conferencee's computer. In general, the conference uses the conferencing window to view a list of venues that can take the form of the aforementioned venue icons and titles, access the aforementioned information about the venues (including accessing the aforementioned venue calendars), and to activate the previously described multicast process. The venue icons can also have smaller, adjacently-located access icons (e.g., small "lock" icons) that indicate whether access is restricted to the venue represented by the venue icon. If a venue has a restricted access, the conference can access it only if authorized to do so.

The conferencees also open and employ, a profile dialog box using the conferencing window to enter information about themselves and to create a thumbnail representing the conference. This is the information that the server uses at least in part to determine whether the conference is authorized to access a particular venue and is the information that can be provided by the server to other conferencees.

To activate the multicast process a conference "enters" a venue by selecting its icon in a venue sector of the conferencing window. This causes the venue sector to display a list of other conferencees who have also entered the venue. The conferences list takes the form of a collection of thumbnails with an adjacent text title identifying the conference. These thumbnails and titles correspond to the thumbnails and name text entered by the conference in the profile dialog box. Small icons can also be displayed adjacent to each thumbnail to indicate whether that conference is providing video, audio, or both from their location. Audio and video feeds from a conference are initiated using the "Play My Audio" and "Play My Video" commands in the "My Tasks" list displayed in a task sector of the conferencing window. A conferences can also obtain information about other conferencees by selecting the thumbnail of the conferences in the venue sector of the window and then reviewing information about the selected conference that is displayed in the task sector of the window.

In addition, when a conference thumbnail is selected, the selecting conference can use "Play Audio" and "Show Video" commands found in a "Participant Tasks" command list of the conferencing window task sector to respectively output the audio and/or to display the video on the display screen of the conferencee's computer, of a selected conferences, assuming these feeds are being provided by that conferences. It is noted that the conferencing window is resized to make room for windows displaying the video feed of a selected conference. Thus, typically a conference would select each of the other conferencees, thereby playing the audio provided by each conferences and displaying the video provided by each conference on the display screen of the computer hosting the conferencing window.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Conferencing System Computing Environment

Figure 1:
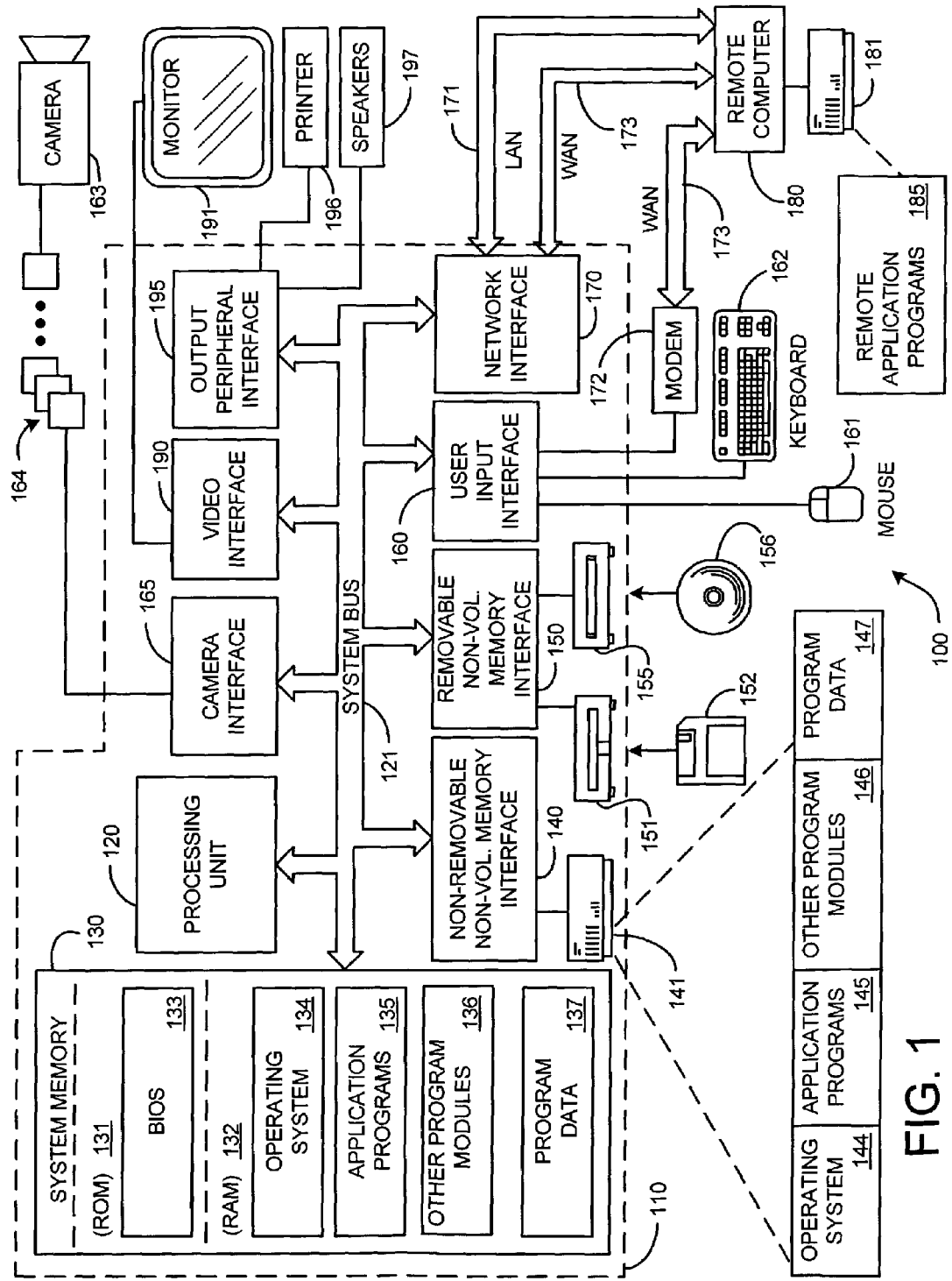
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone or microphone array for capturing audio, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). At least one monitor 191 or other type of display device (e.g., a projection screen and projector) is also connected to the system bus 121 via an interface, such as a video interface 190. In addition to the monitor, computers may also include other peripheral output devices such as speakers 197 and printer 196, which may be connected through an output peripheral interface 195. A camera 163 capable of capturing a sequence of images 164 can also be included as an input device to the personal computer 110. Further, while just one camera is depicted, multiple cameras could be included as input devices to the personal computer 110. Generally, the images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163. The aforementioned camera or cameras 163 can take various forms, such as a digital/electronic still or video camera, or even film/photographic scanner equipment.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LA/V) 171 and a wide area network (WAN) 173, but may also include other networks. Such networking environments are commonplace in offices, enterprise-wide computer networks, intranets and the Internet.

When used in a LA/V networking environment, the computer 110 is typically connected to the LA/V 171 through a network interface or adapter 170.

When used in a WAN networking environment, the computer 110 sometimes includes a modem 172 or other means for establishing communications over the WAN 173, such as the Internet. The modem 172, which may be internal or external, may be connected to the system bus 121 via the user input interface 160, or other appropriate mechanism. Alternately, the computer 110 can be connected to the WAN 173 via aforementioned network interface or adapter 170. This later connection scheme is particularly applicable to the present invention. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 The Conferencing System Configuration

The exemplary operating environment having now been discussed, the next part of this description section will be devoted to a description of the conferencing system configuration. In general, a computer as described above is used by each conference participant (herein referred to as a conference) to send and receive audio and video (A/V) data via a distributed computer network (such as the Internet or a proprietary intranet) to and from all the other conferencees. More particularly, the A/V data sent by a conference is broadcast over the network and the A/V data received by a conference is obtained by subscribing to the broadcasts of other conferencees.

In general, a computer network broadcast (or more properly, "multicast") is provided to the set of receivers who have first "subscribed" to the information. In this case the receivers are the conferencees who have joined the same conference. In order for a conference to participate in a conference, they must have an IP multicast group address to which their A/V data is to be sent starting at the appointed time for the conference. The multicast group address is just a special case of an ordinary IP address. However, unlike an ordinary address which is used to identify the "location" of a receiver where data is to be sent, a multicast group address is used by routers in the network to identify data being transmitted on the network as part of the multicast, so that it can be routed to a subscribing conferences (who will have a completely different address). A conference joins a scheduled conference by "entering" a prescribed venue selected for the meeting. A venue is, in essence, just the aforementioned multicast address, but it seems to the conferencees to be a virtual conference room for the conference. A venue is entered by each conference subscribing to the multicasts of all the conferencees. This is done by the conferences notifying the network that they wish to join the multicast group. These subscriptions cause various routers in the network to update their states, to ensure that the multicast information eventually reaches the subscribing conferencees.

Figure 2:
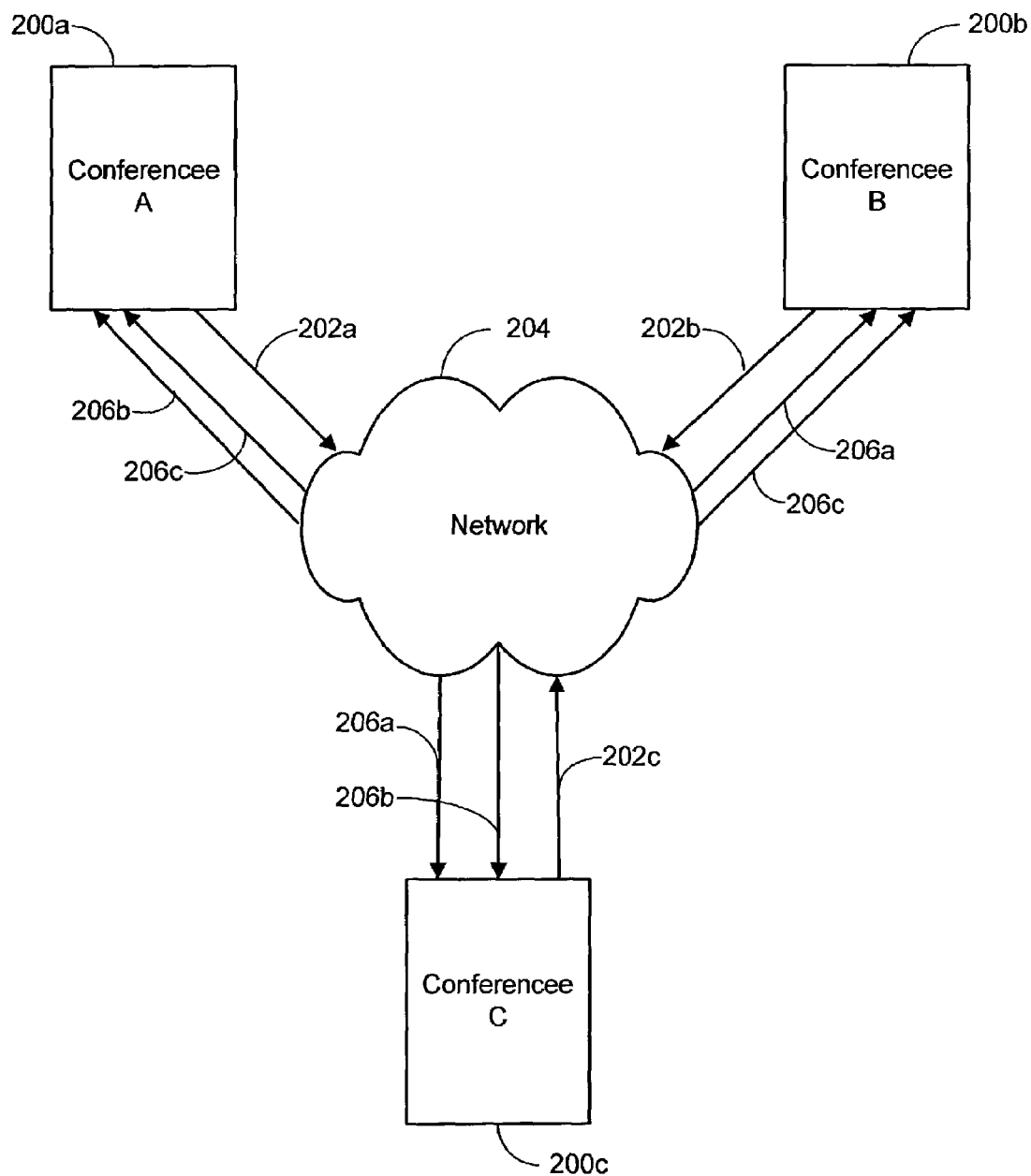
FIG. 2 is a diagram depicting the flow of audio and video data over a distributed computer network between three conferencees participating in a virtual conference according to the present invention.

Thus, referring to FIG. 2, each conference 200a-c sends A/V data 202a-c from their physical location to the network 204 using the specified venue multicast address. When a network router receives data with that address, it sends copies of the data (which is typically in the form of a continuing sequence of packets on the Internet) through each outgoing interface that leads to a subscribing conference. This causes the data 206a-c to reach the conferencees at some point, albeit with the inevitable loss due to network congestion and buffer overflow. However, the losses can be mitigated using a standard layered multicast scheme with integrated forward error correction layers. Protocols are also employed to include identifiers in the A/V data packets that identify the conference that multicast the data. In this way, each conferencee's computer can receive and reconstruct the audio and video sent by each of the other conference, and know what conferencees are participating in the conference. Thus, the audio and video of each of the other conferencees can be played by the receiving conferences.

It is evident for the foregoing description that at the very least a conference needs to know the multicast address associated with a venue. In a simple form of the conferencing system, each of the conferencees' computers could be pre-loaded with a multicast address for each venue the conference can access. However, given that such data is subject to frequent change, in another version of the system, the multicast address data is provided to the conferencees when their conferencing system is activated. For example, a central server called a venue server could be established. Each time a conference starts a program implementing the present conferencing system on their computer, it could employ a pre-loaded network address to contact the server, which would then download the address of one or more venues that the conference can access.

Figure 3:
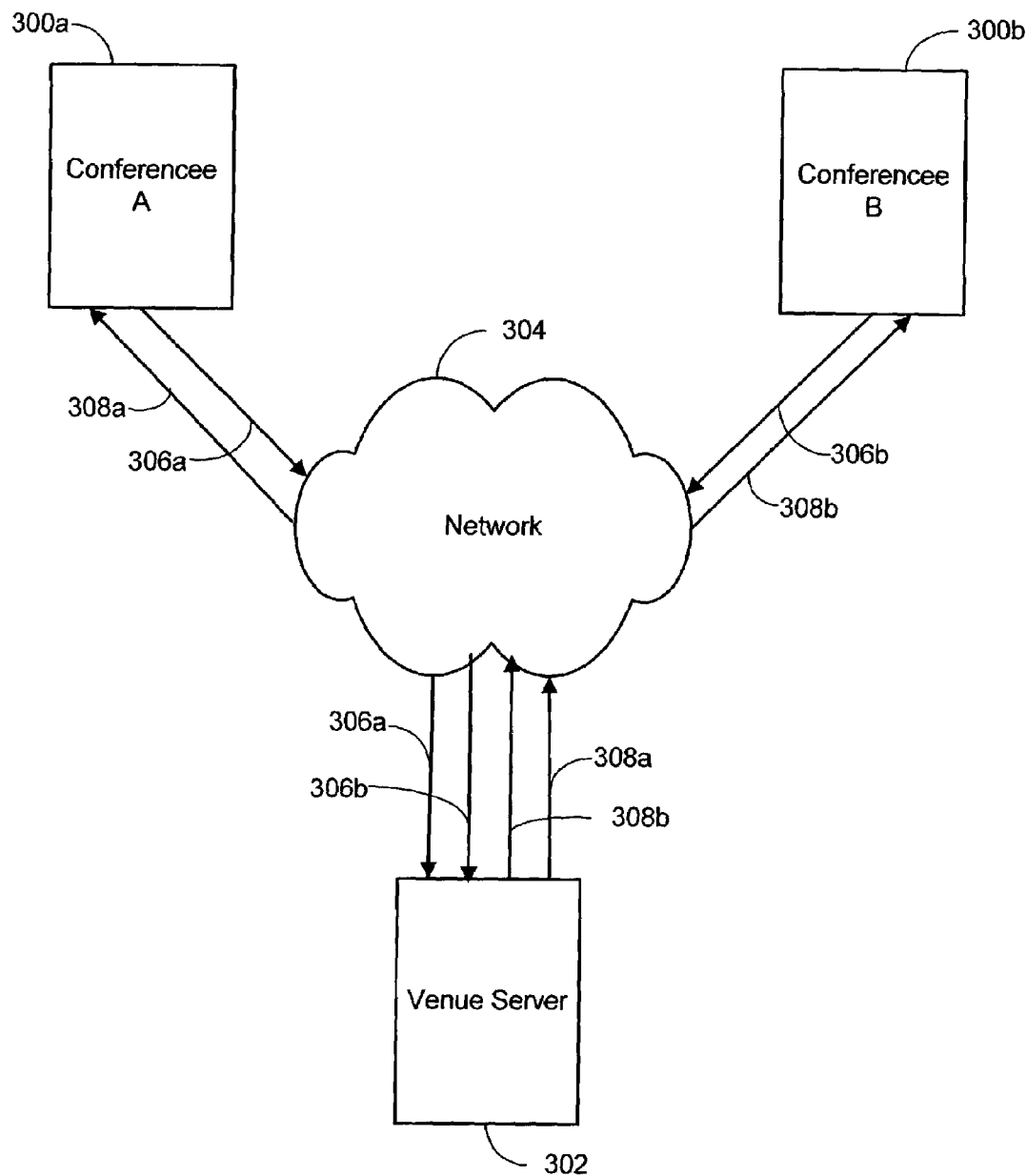
FIG. 3 is a diagram depicting the flow of information over the distributed computer network between two conferencees and a venue server according to the present invention.

The foregoing exchange between a conference and the venue server could also include more than the transfer of multicast addresses. For example, the venue server might be accessed via a web service with all the attendant security and commerce features typical of such services. In such a case, the conference would provide information to a server, which would then determine what venues, if any, the conference is entitled to access. The multicast addresses of the authorized venues would then be provided to the conferences. Still further, the venue server could be a repository of information about each venue, other than just its multicast address. For instance, the server could store and provide the name of the venue to a conferences along with the venue's address. Other information that might be provided includes the affiliation of the venue and who can access it. Once a conference has "joined" a venue and other conferencees are also participating, the conferencees might want information about each other. This could be requested and transferred directly between the conferencees' computers, however, it is also possible for the venue server to act as a repository for conference information. In this latter scenario, each conference would be required to provide certain information to the server where it would be stored. When a conferences is participating in a conference and another participant wants information about that conferences, the server could be queried. The server would then provide the information to the requesting conferences. This conference information could include contact data such as a conferencee's name, physical location, email address and telephone number. The above-described interplay between the conferencees and the venue server can be summarized as follows. Referring to FIG. 3, each conferences 300a-b, sends requests for venue addresses, and optionally requests for venue and conference data (collectively 306a-b), to the venue server 302 via the network 304. In response, the venue server 302 provides addresses 308a-b via the network 304 to the requesting conference 300a-b associated with those venues the conference is allowed to access, as well as optionally any requested venue or conference data (collectively also 308a-b).

It is noted that while only two or three conferencees are depicted in FIGS. 2 and 3, there can be more. For example, in tested versions of the present conferencing system, conferences with five conferencees were held.

To implement the present conferencing system, a conferencee's computer is loaded with conventional processing programs for transmitting, multicasting and receiving A/V data over the network, as well as the unique conferencing system program mentioned previously. In addition, the conferencee's computer is outfitted with A/V equipment, as was generally described in the discussion of the computing environment. However, in order for the present conferencing system to provide a substantially real time conferencing experience, it is desired that high quality video with a low latency be provided. This could be achieved, for example, by employing digital video cameras connected to the conferencees' computers via an IEEE 1394 interface. In addition, while any video codec can be used for the transfer of the video and audio data over the network, some tested versions of the present conferencing system employed M-JPEG, MPEG4, DivX and MSVideo codecs with success. As for the audio portion of the conference, tested versions of the conferencing system employed a high end audio system to handle the site audio requirements that included echo cancellation, automatic gain control and noise reduction. As a result of employing the foregoing conferencing system configuration, full screen video provided at 30 frames per second and with a latency of less than 250 ms was achieved. This was done while maintaining relatively low bandwidth requirements, e.g., only about 256 kb per second per conference with a frame size of 320×240, and only 1024 kb per second per conference with a frame size of 640×480.

3.0 The Conferencing Window

The aforementioned unique conferencing system program was employed to manage the multicast and receipt of A/V data by a conferencee's computer as described above, as well as to provide a user interface between the computer and the conference for operating and controlling the conferencing system. In general, this interface involves displaying an interactive conferencing window that is used by a conference in setting up the receipt of audio and video feeds broadcast by other conferencees from remote locations, and to send audio and video data to the other conferencees. This conferencing window interface will now be described in detail.

Essentially, the conferencing window is a graphical user interface that allows a conference to initiate and broadcast live video and audio and to receive video and audio from individuals or groups of people at other locations all via a distributed network like the Internet or a proprietary intranet.

Figure 4:
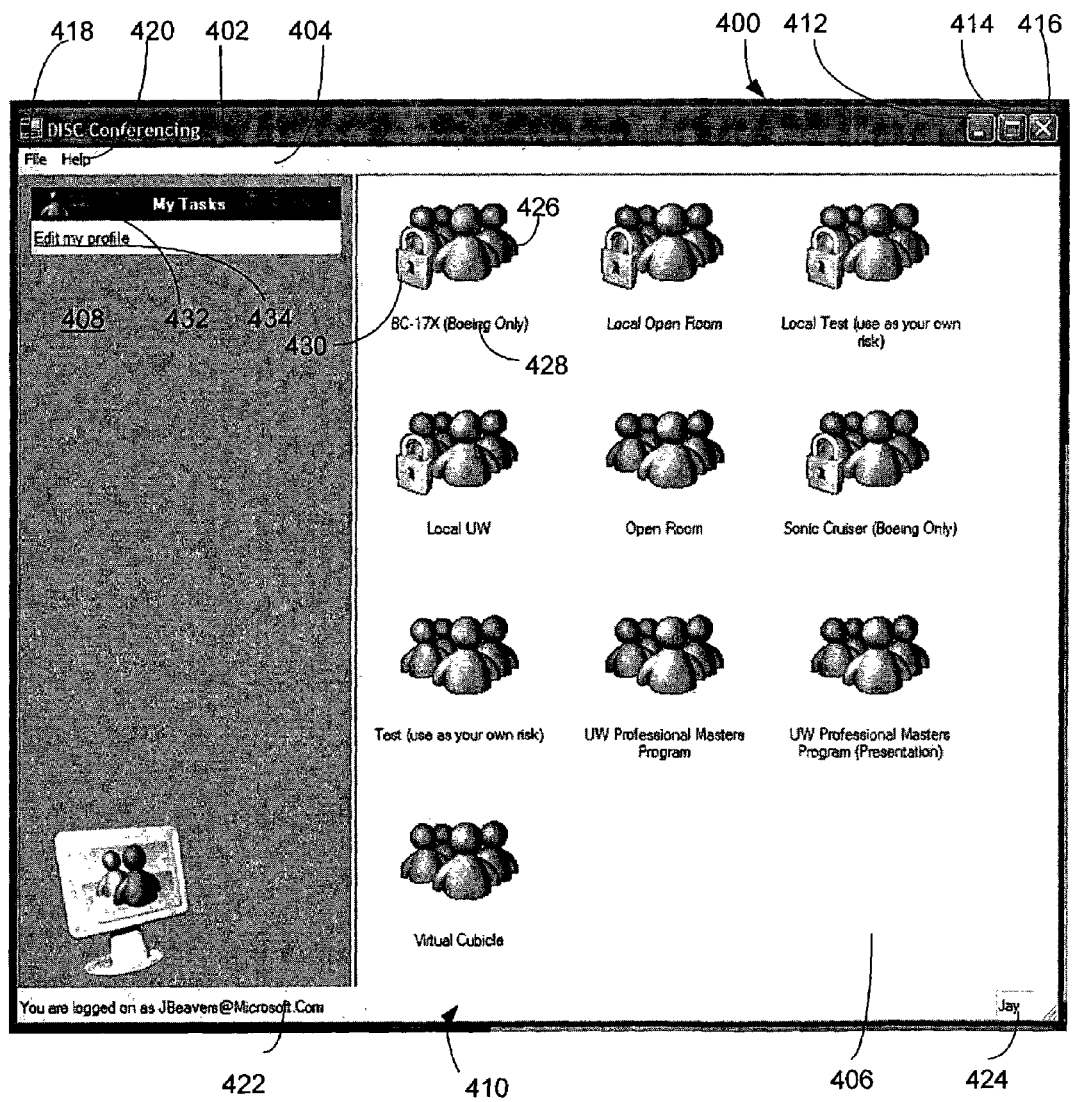
FIG. 4 shows a user interface window layout according to the present video conferencing system.

In reference to FIG. 4, when the present conferencing system program is executed, the conferencing window 400 is displayed to a conference via the display screen of the conferencee's computer. In general, the conferencing window 400 includes a title bar 402, a menu bar 404, a venue sector 406, a task sector 408, and an information bar 410.

The title bar 402 includes a name given to the conferencing window 400, which in the case of the example window shown in FIG. 4 is "Conferencing". To the far right of the title bar 402, the standard window control buttons are displayed, including a minimizing button 412, maximizing button 414 and a button 416 to close the conferencing window 400.

The menu bar 404 includes two menu items—namely a "File" menu item 418 and a "Help" menu item 420. Upon selecting the file menu item 418, a drop-down list of commands (not shown) appears in the conferencing window 400. In tested versions of the window, this list included just one command, namely a standard "Exit" command. The exit command simply closes the conferencing window when selected. Upon selecting the help menu item 420, a drop-down list (not shown) appears in the conferencing window. In tested versions of the present system, this list included only one listing—namely an "About" link. Selecting the about link causes an information box to appear in the conferencing window. This information box is a standard "about" box and includes information such as the title of the program and its version number, copyright data, the licensee's name, and perhaps links to other informational windows. Further, additional links to various help directories, as well as links to "on-line" support sites, could be included, as desired.

The information bar 410 includes two information fields. The first of these fields 422 provides information about the current status of the conferencing process. For example, in the conferencing window configuration seen when the window is first opened, the status field 422 indicates the name that the conferences logged onto the network under. As the conferencing process proceeds, the status field 422 changes to provide pertinent status information. The exact nature of the information can be any desired and is pre-defined by the programmer implementing the present conferencing window and its underlying functionality as specified herein. The second of the information fields 424 is provided to indicate what name the conference has chosen to be identified by, as will be discussed shortly.

As for the venue and task sectors 406, 408, these are somewhat more complex and change depending on the status of the conference. For example, the venue sector 406 initially displays a list of venues prior to a venue being joined, and a list of conferencees in the venue once it is entered. A venue is essentially a "virtual conference room" where all the conferencees "meet" at a prescribed time, and is managed via a venue server that will be described later. The task sector also changes depending on the actions of the conferences. Each of these sectors will be described in more detail in the sections to follow, which have been divided between the period of time before a venue is entered and after it is entered.

3.1 Venue and Task Sector Operations Prior to Entering a Venue

In general, the venue sector 406 initially provides a space to list all the venues that are potentially accessible by a conference. The conferences selects a venue it was agreed will act as the host for the virtual conference at an agreed to time. It is noted that only one venue can be selected at a time. Thus, a conference must disconnect from a selected venue before accessing another one.

In tested embodiments the venue list took the form of a collection of icons 426 with an adjacent text title 428 indicative of the location or nature of the venue represented by the icon. In addition, some private venues include a lock icon 430 to indicate that the audio and video streams from that venue cannot be accessed outside the organization associated with the venue. The venues listed are loaded from a venue server that is automatically contacted via the network when the conferencing window 400 is opened. If there are too many venues to fit icons 426 for them all in the space allocated to the venue sector 406, vertical and/or horizontal scroll bars (not shown) will appear at the periphery of the sector. These scroll bars are used in a conventional manner to bring venue icons into view as desired.

Just adjacent the venue sector 406 is the task sector 408. Generally, the task sector 408 is used to access information about the venues and to initiate certain commands that will be described shortly.

3.1.1 The Profile Dialog Box

Figure 5:
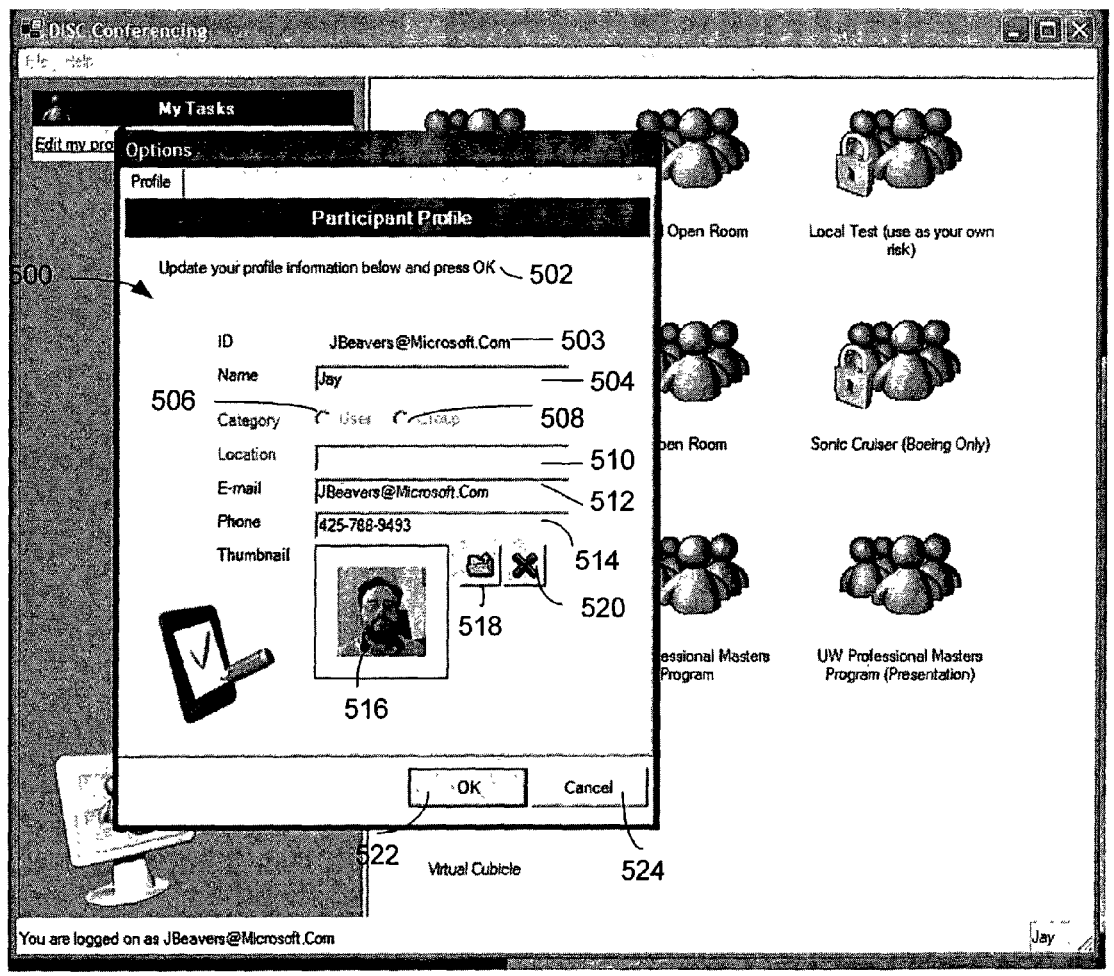
FIG. 5 shows a profile dialog box for entering and editing information regarding the conferences using the present video conferencing system.

Prior to the conference selecting a venue, the only action that can be taken is to edit the conferencee's own information. To this end a "My Tasks" command list 432 is displayed in the task sector 408 with a single command listed there under. This command 434 is entitled "Edit My Profile" in tested versions of the conferencing window. If the conference selects the edit my profile command 434, a profile dialog box appears in the conferencing window. As seen in FIG. 5, the profile dialog box 500 includes several informational and editable fields. The first field 502 provides instructional information about the purpose of the profile dialog box 500. The next filed is a non-editable "ID" field 503 that displays the name that the conference is logged onto the network under, and matches what is displayed in the first field of the aforementioned information bar of the conferencing window. The next field is a data entry field 504 entitled "Name" and is editable by the conference. Essentially, the conference enters the name that will appear adjacent their conference thumbnail that will be discussed shortly. In addition, this name appears in the second field of the aforementioned information bar of the conferencing window.

The next field of the profile dialog box is named the "Category" field and includes a series of checkboxes that allow the conferences to indicate his or her status in regards to the conference. For instance, in the example dialog box 500 shown in FIG. 5, there are two category checkboxes—namely a "User" checkbox 506 and a "Group" checkbox 508. If the conference is at his or her home or office and is participating in the conference alone, then the user checkbox should be selected. However, if the conference represents a group of people gathered in the same location (such as a conference room) to participate in the conference, then the group checkbox is selected. Other category checkboxes could also be added as desired.

The next field in the profile dialog box 500 is the "Location" data entry field 510. This field 510 allows the conference to enter their physical location. There are also two fields for entering contact information. Specifically, an "Email" data entry field 512 is included to allow the conference to enter an email address, and a "Phone" data entry field 514 is included to allow the conferences to enter a telephone number. On the other hand, a profile for a conferences representing a group of people gathered at the same physical location would have an e-mail and telephone number information associated with the site itself or a representative at the site.

The profile dialog box 500 also has a "Thumbnail" sector which displays a currently selected thumbnail 516 associated with the conferences whose profile is described by the box. If no thumbnail is selected this thumbnail space is blank. The thumbnail can be any image or graphic representing the conferences. In the case of a group conference this could be an image of the representative or of the site itself, or some graphic representing the group. A thumbnail 516 is added to the profile dialog box 500, or changed, by selecting a file icon 518 located adjacent the space reserved for the thumbnail image 516. Upon selecting the file icon 518, a standard open file dialog box (not shown) appears in the conferencing window. The conference employs the dialog box to find and select an appropriate image or graphic file. Upon selection of the file, the image data is used to generate a thumbnail that is then displayed in the aforementioned thumbnail space, which is in lieu of the last-displayed thumbnail image if one already existed. There is also a clear thumbnail icon 520 displayed adjacent the file icon 518. Upon selection of the clear thumbnail icon 520, the currently displayed thumbnail image is deleted leaving a blank space.

Once the conference has entered or modified the profile data (or leaves it as is), he or she selects the "OK" button 522 in the profile dialog box to save any new entries and close the dialog box 500. Alternately, the conferences can select the "Cancel" button 524 at any time to close the profile dialog box 500 without saving any changes.

3.1.2 Accessing Venue Information

Referring once again to FIG. 4, the conference can also highlight one of the venue icons in the venue sector 406 to access information about that venue in the task sector 408. Highlighting a venue icon is different from selecting it. Highlighting the venue icon makes the aforementioned information accessible, whereas selecting a venue icon causes the conference to join that venue as will be described shortly. In tested versions of the conferencing window, a venue icon is highlighted by a conventional "single-click" maneuver, and the venue icon is selected using a conventional "double-click" procedure. However, any appropriate alternate highlighting and selection procedure can be implemented, as desired.

Figure 6:
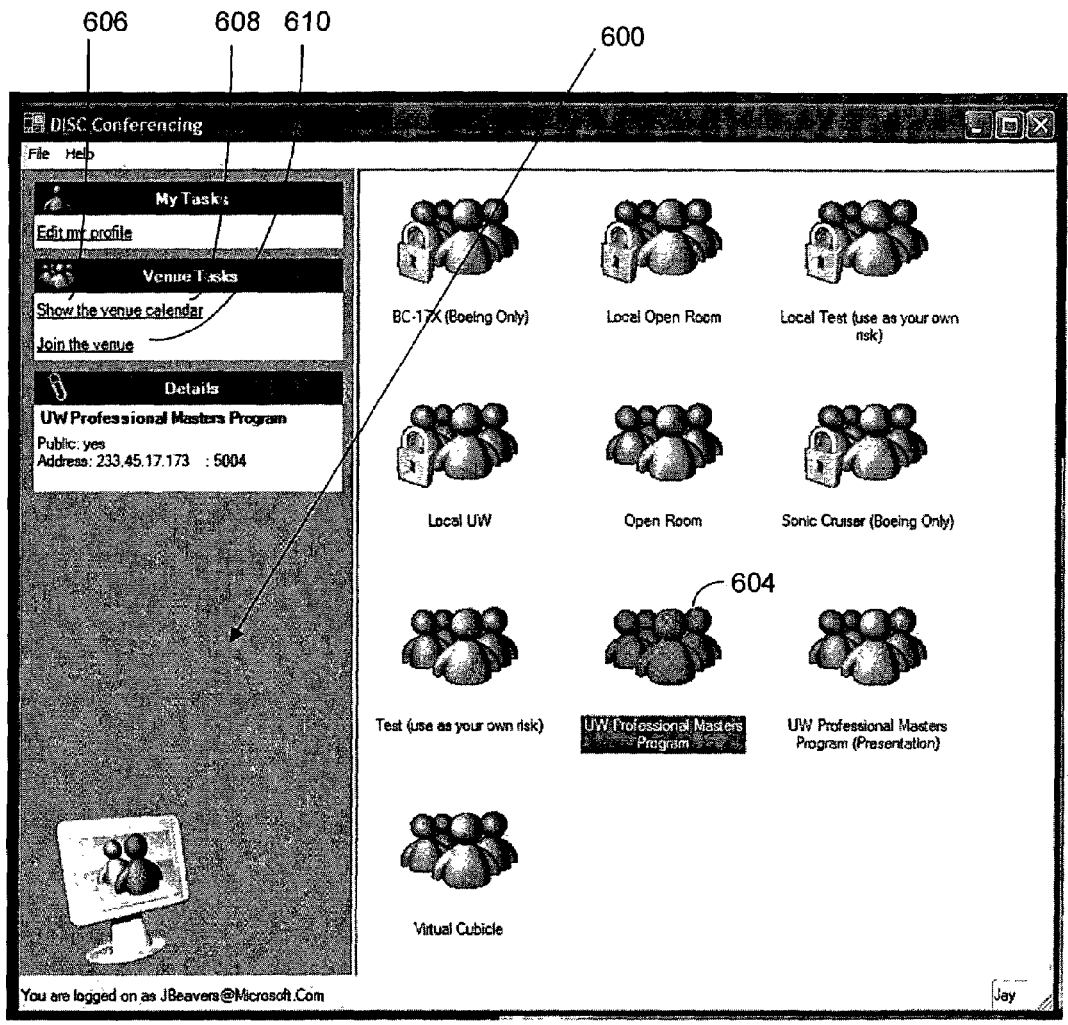
FIG. 6 shows a view of the conferencing system window of FIG. 4 where a venue icon has been highlighted in the venue sector of the conferencing window and a "details" box providing information about the venue associated with the highlighted venue icon is displayed in the tasks sector of the conferencing window.

The venue information is made available in the task sector 408 when a venue icon is highlighted. Specifically, as shown in FIG. 6, a "Details" box 602 appears in the task sector 600. This details box 602 includes information about the highlighted venue 604 such as the name of the venue, its public or private status and a network address. In addition, a "Venue Tasks" command list 606 appears in the task sector 600. When a venue is highlighted, the venue tasks command list 606 displays two selectable commands. The first of these is a "Show the Venue Calendar" command 608. Upon selection of this command 608, a calendar box (not shown) appears in the conferencing window with a list of the conferences that are scheduled for the highlighted venue and when they are to occur. The second command in the venue tasks command list 606 is the "Join the Venue" command 610. Upon selection of this command 610, the participant enters the venue. Thus a participant can enter a venue by selecting the venue's icon in the venue sector, or by highlighting the venue's icon and then selecting the join the venue command 610 in the venue tasks command list 606. The specifics of operations once a venue has been entered will be described next.

3.2 Venue and Task Sector Operations After Entering a Venue

Figure 7:
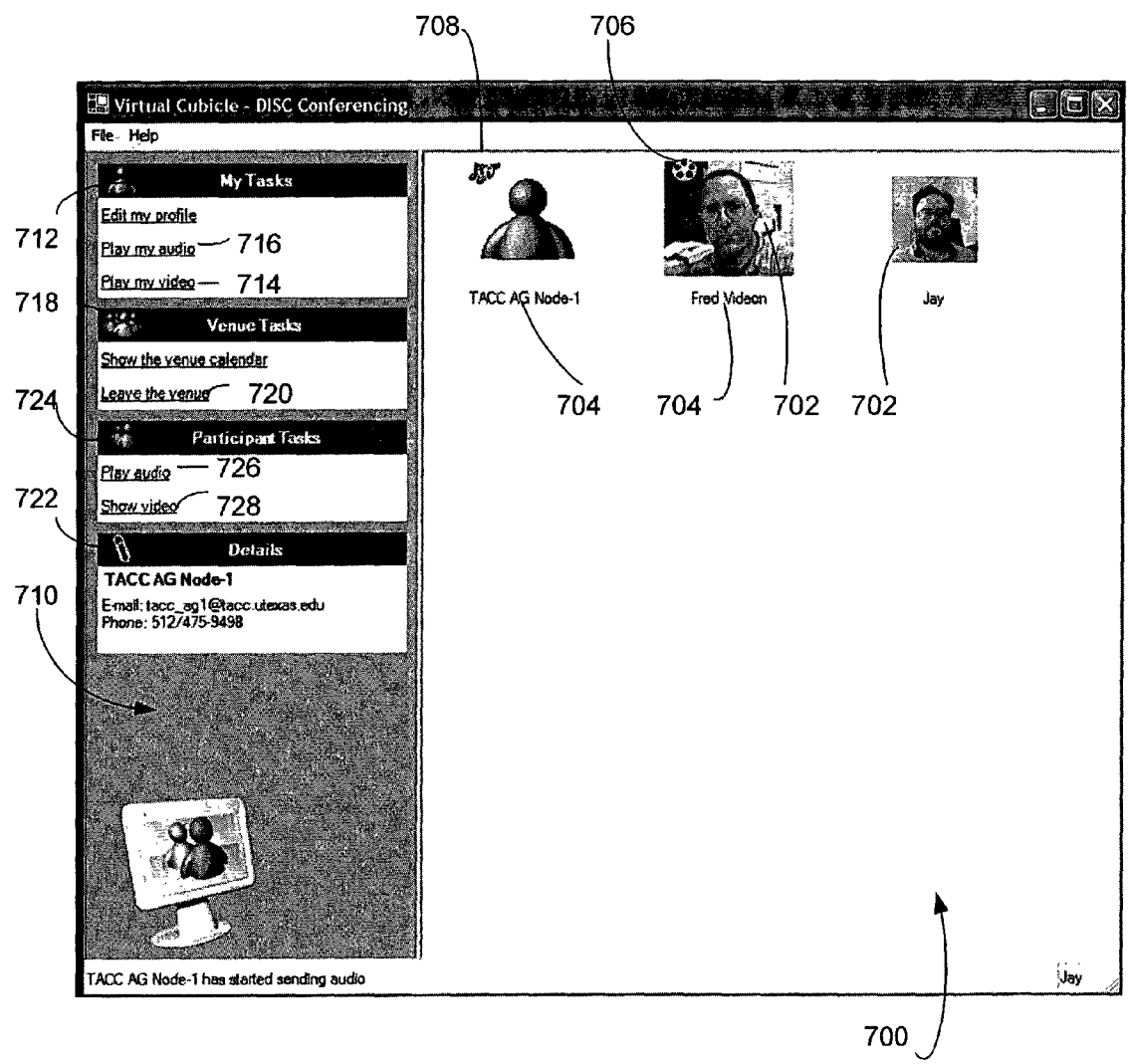
FIG. 7 shows a view of the conferencing system window where a venue has been selected and the venue sector of the conferencing window is changed to show thumbnails of conferencees participating in a virtual conference hosted by the selected venue.

Generally, when a conference selects a venue as described above, the venue sector 700 changes to display a list of the conferencees who have also entered the venue, as shown in FIG. 7. In tested versions of the conferencing window, the conferences list took the form of a collection of thumbnails 702 with an adjacent text title 704 identifying the participant. If there are too many conferencees to fit thumbnails 702 for them all in the space allocated to the venue sector 700, vertical and/or horizontal scroll bars (not shown) will appear at the periphery of the sector. The conference thumbnails 702 shown in the venue sector 700 are the thumbnail images or graphics entered by the conferences in the profile dialog box. Likewise, the text title 704 is the text entered by the conference in the aforementioned "Name" data entry field of the profile dialog box. Small icons are displayed adjacent to each thumbnail to indicate whether that conference is proving video, audio, or both from their location. Specifically, a video icon 706 (which in tested embodiment looks like a reel of movie film) is displayed next to a conference thumbnail 702 if that participant is providing a video feed from their location. In addition, an audio icon (not shown), which in tested embodiment looks like a musical note, is displayed next to a conference thumbnail 702 if that participant is providing an audio feed from their location. And finally, a combined video and audio icon 708 (which in tested embodiments looks like a musical note superimposed onto a movie film reel) is displayed next to a conferences thumbnail 702 if that participant is providing both video and audio feeds from their location.

The task sector 710 also changes when the conference enters a venue. Specifically, the aforementioned "My Tasks" command list 712 is expanded to include two new commands. The first of these is a "Play My Video" command 714, and the second is a "Play My Audio" command 716. If the conference selects the play my video command 714, a video feed is initiated from the conferencee's site. Similarly, if the conference selects the play my audio command 7716, an audio feed is initiated from the conferencee's site. Depending on whether a video or audio feed, or both, is initiated by a conference, the appropriate icon described above is displayed adjacent the conferencee's thumbnail in the venue sector to indicate their broadcast status.

The venue tasks command list 718 also changes when the conference enters a venue. Namely, the "Enter the Venue" command changes to a "Leave the Venue" command 720. Upon selection of this command, the conference ceases communications with the network in that the conference stops multicasting A/V data and stops subscribing to the multicasts of the other conferencees.

Once the conference enters a venue, and the thumbnails 702 of each current participant are displayed in the venue sector 700, the conference can obtain information about another conferences by selecting the conferencee's thumbnail. This action results in a "Details" box 722 appearing in the task sector 710. The details box 722 provides information about the selected conference such as their name, physical location, email address and phone number. This information corresponds to the data that was entered by the conference in the "Name", "Location", "E-mail" and "Phone" data entry fields of the previously-described profile dialog box.

Figure 8:
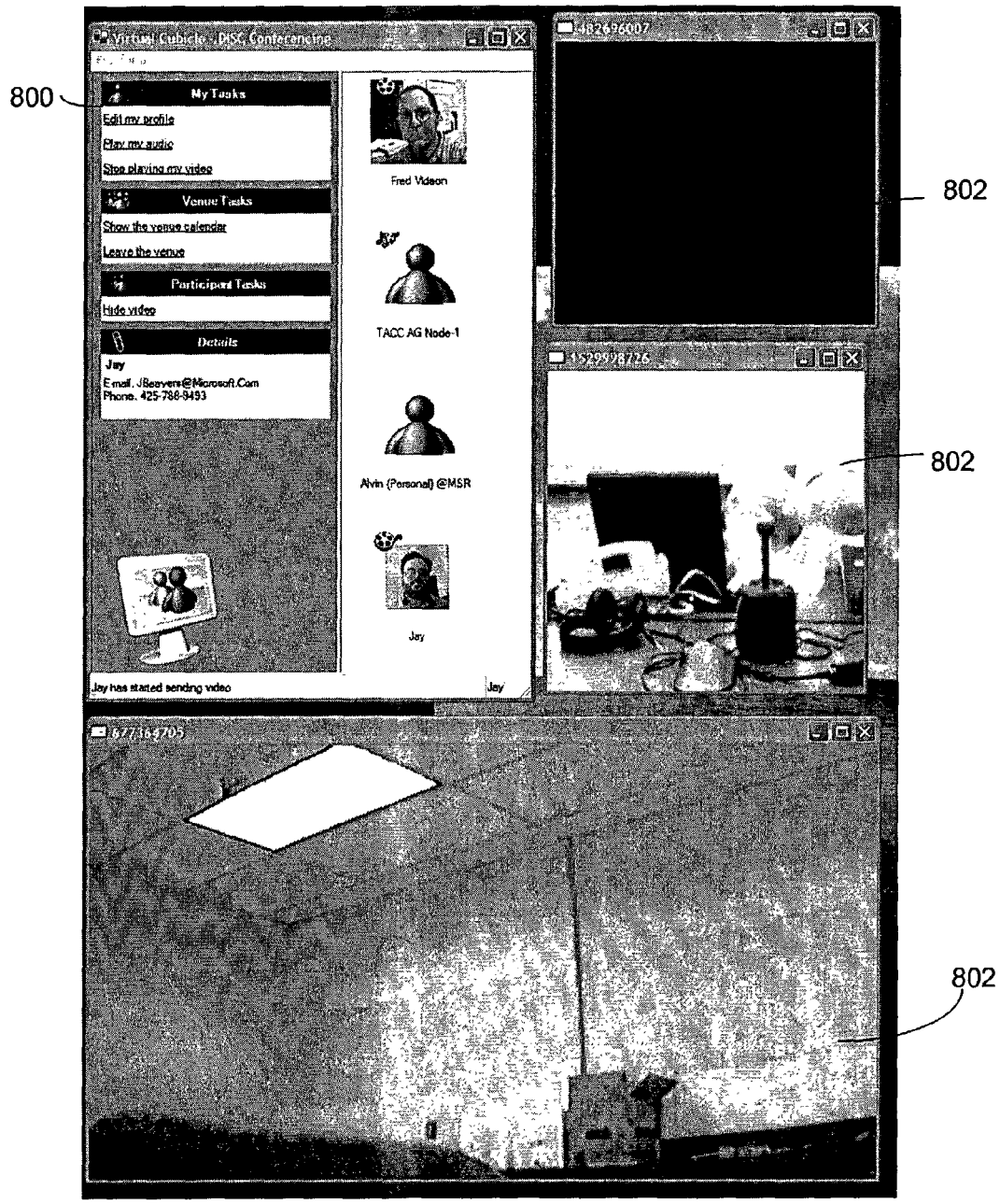
FIG. 8 shows a view of the conferencing system window of FIG. 7 where the window has been reduced in size to accommodated windows displaying the video feeds from other conference participating in a virtual conference.

Finally, a new command list also appears in the task sector 710 when the site conference enters a venue. Namely, a "Participant Tasks" command list 724 is added. The participant tasks command list 724 has two commands, namely a "Play Audio" command 726 and a "Show Video" command 728. In general, the aforementioned play audio and show video commands are used to respectively output the audio and/or to display the video on the display screen of the computer, of a selected conferences, assuming these feeds are provided. A conference is selected by selecting that conferencee's thumbnail in the venue sector. Referring now to FIG. 8, in order to display the video from a selected conference, the conferencing window 800, is resized via conventional methods to make room for one or more windows 802 displaying the video feed of the selected conferencees. In the example screen shown in FIG. 8, the conferencing window 800 has been downsized and confined to a region of the presentation computer's display screen in the upper left hand corner. In addition, the example screen shows three video windows 802 that have been displayed by respectively selecting the show video command after selecting each of three conferencees having video feeds available. It should be noted that the video window in the right hand corner of FIG. 8 is black because the lights are turned off in the room associated with the conference providing the video feed for that video window.

3.3 The Conferencing Window Process

Figure 9:
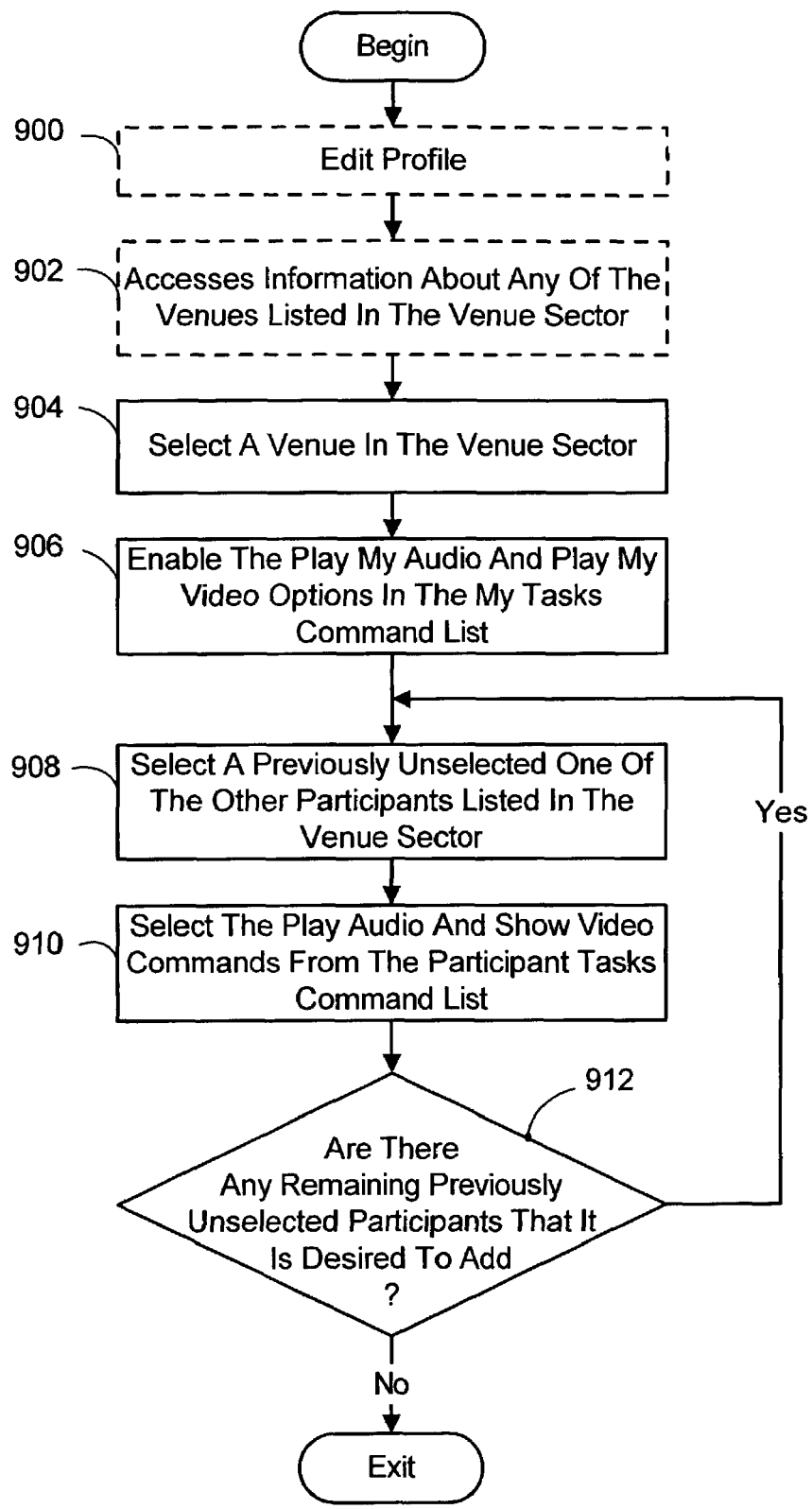
FIG. 9 is a flow chart diagramming an overall process according to the present invention for entering a venue that is hosting a virtual conference and participating in the conference.

Given the foregoing conferencing window interface, the following process can be used to disseminate and receive the video and audio portions of a typical video conference according to the present conferencing system. Referring to FIG. 9, an individual conference or representative conference of a group site first edits their profile if needed (optional process action 900), and then accesses information about any of the venues listed in the venue sector, if desired (optional process action 902). The individual conference and representative conference will be referred to simply as a conference hereinafter in the description of the conferencing window process for convenience.

The conference selects the venue that was agreed to act as the virtual conference room for the scheduled video conference in the venue sector of the conferencing window (process action 904). The conference then enables the play my audio and play my video options in the My Tasks command list (process action 906). Finally, the conferences selects a previously unselected one of the other conferencees listed in the venue sector (process action 908) and selects the play audio and show video commands from the Participant Tasks command list (process action 910). It is then determined if there are any remaining previously unselected conferencees that it is desired to add (process action 912). If so, then process actions 908 through 912 are repeated. If not, the process ends.

While the invention has been described in detail by specific reference to preferred embodiments thereof, it is understood that variations and modifications thereof may be made without departing from the true spirit and scope of the invention. For example, while the conferencing system user interfaces have been described as having a particular arrangement of sectors and other elements, these elements can be rearranged within the respective windows as desired. Likewise, while the menu items and the task lists associated with the conferencing window were described as being in a certain order, these elements can be reordered as desired. Also, the names and titles given to an element of the conferencing system interface could be changed to any desired alternate name or title. Further, it is noted that while full-featured versions of the conferencing system interfaces were described, versions having fewer of these features are also possible and within the scope of the present invention.

Wherefore, what is claimed is:

1. A video conferencing system, comprising:
 a plurality of general purpose computing devices, each of which is in communication with the same distributed computer network, and each of which comprises audio equipment and a video camera for capturing audio and video (A/V) at a site where a conferencee is located; and
 each computing device further comprising a computer program having program modules executable by the computing device, wherein the computing device is directed by the program modules of the computer program to,
  multicast A/V feeds, which are captured at the conferencee's location by said audio equipment and video camera, over the network directly to other conferencees participating in a video conference via the network, said multicasting comprising,
   contacting a server that is in communication with the network using a prescribed network address to obtain a multicast address assigned to the conference,
   requesting multicast addresses associated with conference venues to which the requesting conferencee is allowed access including the multicast address assigned to the conference by providing information to the server which the server uses to assess whether the conferencee is allowed access to a conference venue based on the access criteria established for that venue, wherein the server maintains a plurality of multicast addresses associated with different conference venues, and a list of criteria for determining whether a conferencee is allowed access to a particular venue,
   receiving from the server over the network multicast addresses of venues to which the conferencee is authorized to access including the multicast address assigned to the conference, and
   transmitting said A/V feeds to the multicast address assigned to the conference,
  subscribe to and receive A/V feeds multicasted over the network from other conferencees participating in a video conference via the network, wherein said multicasted A/V feeds are received directly from each other multicasting conferencee, and
  render and play the A/V feeds received over the network from the other conferencees.

2. The video conferencing system of claim 1, wherein the program module for multicasting A/V feeds over the network comprises a sub-module for multicasting the A/V feeds using a layered multicast format comprising forward error correction layers, and wherein the program module for rendering and playing the A/V feeds received over the network from other conferencees comprises a sub-module for employing information extracted from the error correction layers to reconstruct A/V feeds which are lost or corrupted In transmission over the network.

3. The video conferencing system of claim 1, wherein the program module for multicasting A/V feeds over the network comprises a sub-module for including identification data in the multicast identifying the conferencee sending the A/V feeds.

4. The video conferencing system of claim 3, wherein the program module for rendering and playing the A/V feeds received over the network from other conferencees comprises a sub-module for using the identification data included in the multicast from each of the other conferencees to distinguish which A/V feeds received are from what conferencee so as to separately render and then play the A/V received from each other conferencee in a separate display window on a display screen.

5. The video conferencing system of claim 1, wherein the server maintains information about each conferencing venue other than its multicast address, and wherein the computer program further comprises a program module for obtaining said conferencing venue information comprising sub-modules for:
 contacting the server if not already in contact therewith;
 requesting information about at least one of the conferencing venues other than its multicast address; and
 receiving said conferencing venue information sent by the server over the network.

6. The video conferencing system of claim 5, wherein said conferencing venue information comprises at least one of (i) the name assigned to the venue, (ii) the venue's affiliation, and (iii) access criteria associated with the venue.

7. The video conferencing system of claim 1, wherein the server maintains information about each conferencee, and wherein the computer program further comprises a program module for obtaining said conferencee information comprising sub-modules for:
  contacting the server if not already in contact therewith;
  requesting information about another conferencee; and
  receiving said conferencee information sent by the server over the network.

8. The video conferencing system of claim 7, wherein the sub-module for contacting the server, comprises a sub-module for requiring each conferencee contacting the server to provide said conferencee information about themselves.

9. The video conferencing system of claim 8, wherein said conferencing information comprises at least one of a conferencee's (i) name, (ii) physical location, (iii) email address, and (iv) telephone number.

10. The video conferencing system of claim 1, wherein the computer program further comprises a program module for obtaining information about other conferencees comprising sub-modules for:
  requesting information about another conferencee directly from the conferencee's computing device via the network; and
  receiving said conferencee information sent by the requested conferencee over the network.

11. The video conferencing system of claim 1, wherein the video camera is a digital video camera which is connected to the computing device via a IEEE 1394 interface.

12. The video conferencing system of claim 1, wherein the audio equipment performs echo cancellation, automatic gain control and noise reduction.

13. The video conferencing system of claim 1, wherein the computer program further comprises a program module for encoding the video feed prior to it being multicast and decoding the video feed once it is received.

14. The video conferencing system of claim 13, wherein the program module for encoding and decoding the video feed employs one of an M-JPEG, MPEG-4, DivX or MSVideo codec.

15. A computer-implemented process for participating in a video conference over a distributed computer network, comprising performing the following process actions:
  multicasting audio and video (A/V) feeds, which are captured at a conferencee's location, over the network directly to other conferencees participating in a video conference, said multicasting comprising,
    contacting a server that is in communication with the network using a prescribed network address to obtain a multicast address assigned to the conference,
    requesting multicast addresses associated with conference venues to which the requesting conferencee is allowed access including the multicast address assigned to the conference by providing information to the server which the server uses to assess whether the conferencee is allowed access to a conference venue based on the access criteria established for that venue, wherein the server maintains a plurality of multicast addresses associated with different conference venues, and a list of criteria for determining whether a conferencee is allowed access to a particular venue,
    receiving from the server over the network multicast addresses of venues to which the conferencee is authorized to access including the multicast address assigned to the conference, and
    transmitting said A/V feeds to the multicast address assigned to the conference;
  subscribing to and receiving A/V feeds multicasted over the network from other conferencees participating in the video conference, wherein said multicasted A/V feeds are received directly from each other multicasting conferencee, and
  rendering and playing the A/V feeds received over the network from the other conferencees.

16. A computer-readable storage medium having computer-executable instructions stored thereon for participating in a video conference over a distributed computer network, said computer-executable instructions operable to:
  multicast audio and video (A/V) feeds, which are captured at a conferencee's location, over the network directly to other conferencees participating in a video conference, said multicasting comprising,
    contacting a server that is in communication with the network using a prescribed network address to obtain a multicast address assigned to the conference,
    requesting multicast addresses associated with conference venues to which the requesting conferencee is allowed access including the multicast address assigned to the conference by providing information to the server which the server uses to assess whether the conferencee is allowed access to a conference venue based on the access criteria established for that venue, wherein the server maintains a plurality of multicast addresses associated with different conference venues, and a list of criteria for determining whether a conferencee is allowed access to a particular venue,
    receiving from the server over the network multicast addresses of venues to which the conferencee is authorized to access including the multicast address assigned to the conference, and
    transmitting said A/V feeds to the multicast address assigned to the conference;
  subscribe to and receive A/V feeds multicasted over the network from other conferencees participating in the video conference, wherein said multicasted A/V feeds are received directly from each other multicasting conferencee, and
  render and play the A/V feeds received over the network from the other conferencees.

* * * * *

UNITED STATES PATENT AND TRADEMARK OFFICE
CERTIFICATE OF CORRECTION

| | | |
|---|---|---|
| PATENT NO. | : 7,487,211 B2 | Page 1 of 1 |
| APPLICATION NO. | : 10/305319 | |
| DATED | : February 3, 2009 | |
| INVENTOR(S) | : Jay Beavers et al. | |

It is certified that error appears in the above-identified patent and that said Letters Patent is hereby corrected as shown below:

In column 16, line 34, in Claim 2, delete "In" and insert -- in --, therefor.

Signed and Sealed this
Third Day of May, 2011

David J. Kappos
*Director of the United States Patent and Trademark Office*